United States Patent
Hanisko

(10) Patent No.: US 6,366,201 B1
(45) Date of Patent: Apr. 2, 2002

(54) PARALLEL RESISTOR ARRAY FOR PROGRESSIVELY DETECTING BRAKE LINING WEAR

(75) Inventor: John Cyril P. Hanisko, Southfield, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/766,582

(22) Filed: Jan. 23, 2001

(51) Int. Cl.[7] ............................................... B60Q 1/00
(52) U.S. Cl. ........................ 340/454; 340/453; 73/86; 73/121; 188/1.11 E; 188/1.11 R; 188/1.11 W
(58) Field of Search ................................. 340/454, 453; 73/86, 121; 188/1.11 W, 1.11 L, 1.11 R, 18 A, 1.11 E; 200/61.44; 324/700

(56) References Cited

U.S. PATENT DOCUMENTS

| | | | |
|---|---|---|---|
| 2,078,703 A | 4/1937 | Wisniewsk | 188/79.53 |
| 2,494,269 A | 1/1950 | Sparkes | 340/449 |
| 3,314,618 A | 4/1967 | McDonald | 241/299 |
| 3,675,197 A | 7/1972 | Bennett et al. | 340/454 |
| 3,805,228 A | 4/1974 | Peeples | 340/454 |
| 4,188,613 A | 2/1980 | Yang et al. | 340/454 |
| 4,646,001 A | 2/1987 | Baldwin et al. | 324/700 |
| 4,824,260 A | 4/1989 | Novotny et al. | 374/179 |
| 5,608,376 A | 3/1997 | Ito et al. | 340/459 |
| 5,637,794 A * | 6/1997 | Hanisko | 73/121 |
| 5,835,009 A | 11/1998 | Hanisko | 340/454 |

* cited by examiner

Primary Examiner—Edward Lefkowitz
Assistant Examiner—Davetta W. Goins
(74) Attorney, Agent, or Firm—Liniak, Berenato, Longacre & White

(57) ABSTRACT

A parallel resistor array for progressively detecting brake lining wear. A plurality of conductors are embedded within a brake lining or otherwise disposed between the brake surface and an actuator. Each of the conductors is connected to a resistor that is in turn connected to an indicator circuit. The indicator circuit is also connected to the brake surface. The conductors have progressively increasing lengths extending from the brake surface to the actuator. When the brakes are applied, the brake surface may contact at least one of the conductors to close the indicator circuit. As the brake lining wears, each of the conductors progressively contact the brake surface when the brakes are applied thus progressively adding a resistor to the indicator circuit. The conductors and resistors are arranged in parallel and thus as the brake lining wears, the overall resistance in the indicator circuit progressively decreases. Progressive brake lining wear may then be detected directly corresponding to the change in resistance in the indicator circuit.

12 Claims, 2 Drawing Sheets

PARALLEL RESISTOR ARRAY FOR PROGRESSIVELY DETECTING BRAKE LINING WEAR

BACKGROUND OF THE INVENTION

1. Field of the Invention

The present invention is directed to a brake lining wear sensor and is more particularly directed to an erodable parallel array for detecting progressive brake lining wear.

2. Summary of the Prior Art

Various brake lining wear detection systems are known in the art. In addition, temperature measurement systems are known. However, few brake lining monitoring systems combine both wear detection and temperature sensing. One such temperature and wear detection technique monitors the resistance of a temperature sensitive resistor yielding a signal which represents the operating temperature of the brake lining so that extreme temperature conditions can be detected and corrective action taken. Once the electrical conductive loop is worn away, an open circuit is detected which signals the need for lining replacement.

One method to detect brake lining employs an embedded conductive wire loop within the brake lining. When the loop is broken and furthermore, when electrical contact is made between the wire loop and a brake drum surface, lining wear out is detected. Another brake wear and temperature measurement system utilizes a plurality of thermo-responsive elements disposed within the brake lining where each element is selectively monitored to determine if abnormal temperatures have been encountered and/or whether the brake lining has worn to such an extent that one or more of the thermally responsive elements have been broken.

A more traditional brake temperature indication means comprises a thermocouple disposed within the brake lining connected to a display means to indicate operating temperature of the brake lining. A similar technique uses a combination temperature and wear sensor disposed in a brake cylinder where the sensor has a slider mechanism that is pressed on the face of a brake cylinder to indicate brake wear and also includes a temperature sensing device thereby indicating the wear of the brake lining and overheating of the brake fluid through a pair of lead out wires.

It is an object of the present invention to improve upon the drawbacks of the related art devices.

SUMMARY OF THE INVENTION

The present invention is directed to a parallel resistor array for progressively detecting brake lining wear. A plurality of conductors are embedded within a brake lining or otherwise disposed between the brake surface and an actuator. Each of the conductors is connected to a resistor that is in turn connected to an indicator circuit. The indicator circuit is also connected to the brake surface. The conductors have progressively increasing lengths extending from the brake surface to the actuator. When the brakes are applied, the brake surface may contact at least one of the conductors to close the indicator circuit. As the brake lining wears, each of the conductors progressively contact the brake surface when the brakes are applied thus progressively adding a resistor to the indicator circuit. The conductors and resistors are arranged in parallel and thus as the brake lining wears, the overall resistance in the indicator circuit progressively decreases. Progressive brake lining wear may then be detected directly corresponding to the change in resistance in the indicator circuit.

DESCRIPTION OF THE PREFERRED EMBODIMENT

The present invention detects or senses progressive brake lining wear by sensing a change in resistance in a sensing circuit as the brake lining 11 wears. To facilitate this detection a grounded brake surface 13 progressively contacts additional conductors $W_1$–$W_n$ within or adjacent the brake lining 13 as the lining wears. Consequently, the overall resistance of the sensing circuit changes.

Figure 1:
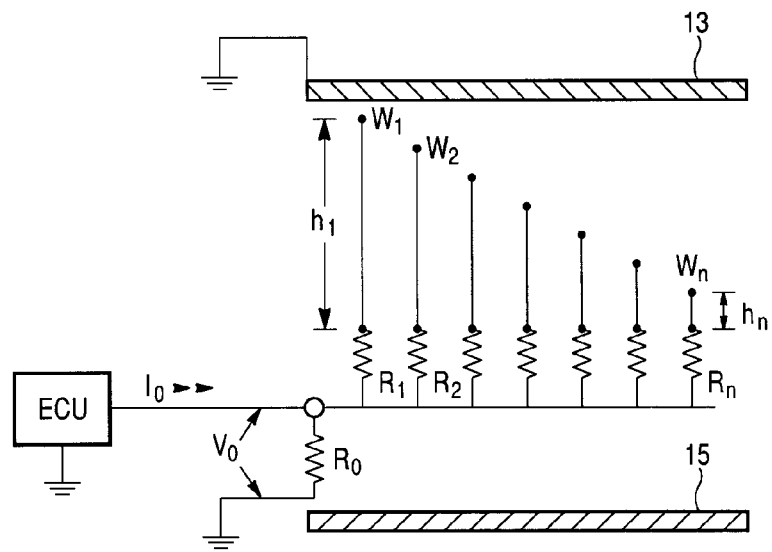
FIG. 1 is a schematic view of the parallel resistor array and brake lining sensing circuit according to the present invention.
Figure 2:
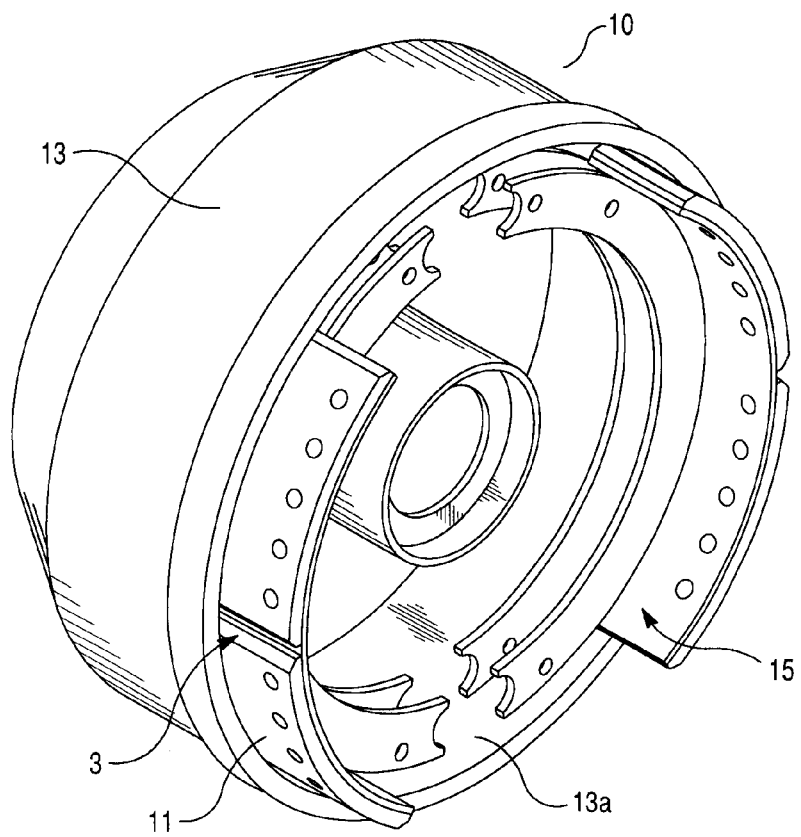
FIG. 2 is a perspective view of a drum brake assembly incorporating the brake sensor of the present invention.

Referring to FIG. 1, conductors $W_1$ through $W_n$ each are connected to a respective resistor $R_1$ through $R_n$. The conductors have a progressively varying length, $H_1$ thorough $H_n$, extending along an orthogonal distance between the brake surface and the actuator. The initial sense resistor $R_0$ is employed to provide an initial resistance to the sensing circuit. $I_0$ is a constant current provided by the ECU. $V_0$ represents the voltage drop across the resistor network. Initially, $V_0=I_0R_0$. As the drum brake surface 13 wears down the lining 11, it will eventually contact $W_1$ providing a path to ground through resistor R1 while the brake is engaged. Because $W_1$ is erodable, this path will be maintained on each subsequent engagement of the brake surface throughout the wear life of the lining. Consequently, each subsequent application of the brake causes V0 to change from $V_0=I_0R_0$ to $V_0=I_0(R_1R_0/(R_1+R_0))$.

As the lining continues to wear, resistors $R_{2-Rn}$ are progressively added to the circuit. Thus $V_0$ continues to progressively decrease as the lining wears and additional resistors are added to the circuit. Thus the voltage across the sensing/indicator circuit may be represented by the following equation $V_0=(R_0*R_1*R_2 \ldots *R_n)/(R_0+R_1+R_2+\ldots R_n)$. Thus $V_0$ decreases in magnitude as the brake lining is worn down.

The conductors $W_{1-n}$, have progressively decreasing heights $H_1$–$H_n$. The progressively varying heights may be designed to provide an average rate of wear. For instance, the height of the conductors $W_1$ may be equally incremented as for the following example: $H_1$=0.700", $H_2$=0.625", $H_3$=0.550 $H_4$=0.475, $H_5$=0.400, $H_6$=0.325", $H_7$=0.250". Knowing the precise height of the conductors within the lining, an interval average rate of wear may be determined between successive erosion of the conductors represented by the following equation $h_{i-1}$–$H_i$/M where M is the mileage accumulated within the interval. It is to be understood that a cumulate average wear rate may be simply determined by tracking the cumulative average as each conductor makes contact with the brake surface. When the brake surface finally contacts conductor $W_n$, the resulting value of $V_0$ will indicate the lining replacement is needed.

Because the present wear sensing circuit depends on contact with the brake surface, the present circuit may also act as a brake engagement sensor. When the brakes are not applied $V_0$ will equal the voltage across the initial resistant $R_0$. As the brakes are applied, there will be a sudden drop in the resistance as the drum surface contacts at least one of the conductors. Thus this sudden voltage change will not only indicate present state of progressive wear, but that the brakes are engaged.

$R_0$ may either be located within the ECU or within the brake lining or sensor. If $R_0$ is an RTD located within the lining or sensor, then a two wire harness is needed. A first wire is needed to establish a connection between $R_0$ and ground and a second harness to establish a connection between the parallel array resistors $R_{1-n}$ and the ECU. If however, $R_0$ is located within the ECU then only a single wire harness is needed.

It is noted that resistors $R_{1-n}$ may either be located within the sensor or lining or may be relocated to a more benign environment adjacent the brake lining to reduce the effects of high brake temperatures during braking. In such an instance multiple wire connections must be made from the brake lining/sensor to the location of the resistors to maintain the parallel arrangement. However, only a single wire will be needed to establish a connection between the array and the ECU.

The specific value of the resistors should be selected to provide definitive measurements. The resistors are preferably selected according to the following equation:

$R_0^{(min)} * R_i^{(max)} / (R_0^{(max)} + R_i^{(max)})$ is less than $R_0^{(min)}$ where:

$R_i^{(max)}$ is the largest of the sensor resistors values $R_0^{(max)}$ is the largest expected resistance (Occurs at highest expected temperature)

$R_0^{(min)}$ is the smallest expected RTD resistance which occurs at the lowest expected temperature. However, the resistors may also be of substantially equal value.

This approach is particularly suited to perform well in harsh application environments.

When the brake lining 11 is new, or before the brake surface contacts the initial conductor $W_1$ the initial resistance $R_0$ will indicate minimal or no wear. After the ligning is worn to make contact with the first conductor $W_1$, the resistance will decrease indicating slight wear. As the lining progressively wears, subsequent conductors $W_{2-n}$ contact the brake surface 13a to progressively add resistors $R_{2-n}$ to the circuit.

Figure 3:
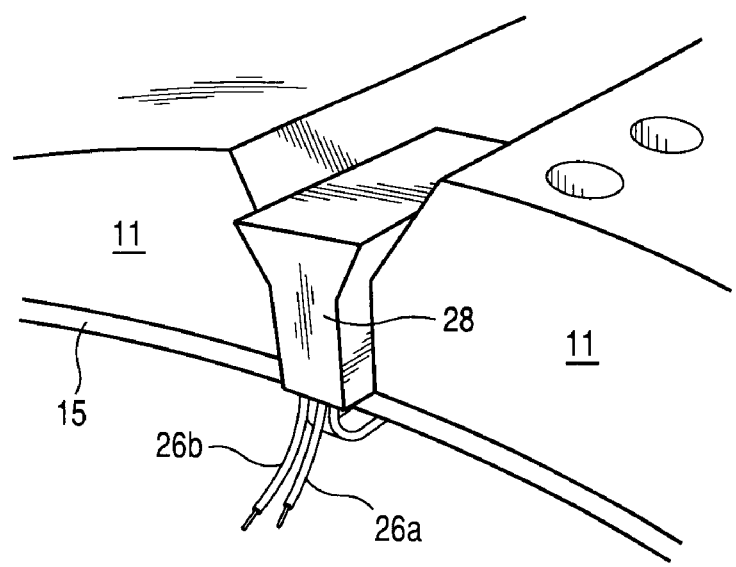
FIG. 3 is a perspective view of a modular sensor attached to the brake assembly of FIG.2.

The present invention is preferably employed in a drum brake assembly 10 as shown in FIG. 3. However, other brake assemblies may be employed. Referring now to FIG. 3, a brake drum 13 has an internal brake surface 13a for frictionally engaging the brake lining 11. An actuator such as an S-cam arrangement displaces the brake shoes 15 towards the brake surface 13a. Brake linings 11 are mounted to the brake shoe 15 to frictionally engage the brake drum 13 and thus provide a braking force. The generic brake drum arrangement 10 and actuation is well known in the art.

The parallel array may be formed within a modular unit 25 mounted between a pair of brake lining surfaces 11 as generally shown by arrow 3, and further depicted in FIG. 3, with a terminal end adjacent or substantially flush with the outer surface of the brake lining 11. The specific connection to the brake shoe 15 is not shown. However the specific connection is not critical to the present invention. Any suitable connection that maintains radial alignment of the modular unit during braking may be employed.

In the embodiment of FIG. 3, the conductors $W_{1-n}$ extend in a direction between the brake surface and the brake shoe in progressive varying lengths as previously described. The conductors may be aligned axially. The initial resistance $R_0$ and associated resistors $R_{1-n}$ may also be embedded within the modular unit 25. In such an instance a two-wire harness is needed. A first wire 26a establishes a connection between the array resistors $R_n$ and the ECU and the second lead connects the initial resister $R_0$ to ground. It is also to be understood, that the resistor array $R_{1-n}$ and initial resistor $R_0$ may be relocated to eliminate any effects of heat generated during braking. In such an instance, the initial resistance $R_0$ may be located within the ECU to eliminate the necessity for lead 26B and a plurality of lead wires may emerge from the modular unit 25 to a remotely positioned parallel array (not shown) from which a single wire establishes connection to the ECU.

Figure 4:
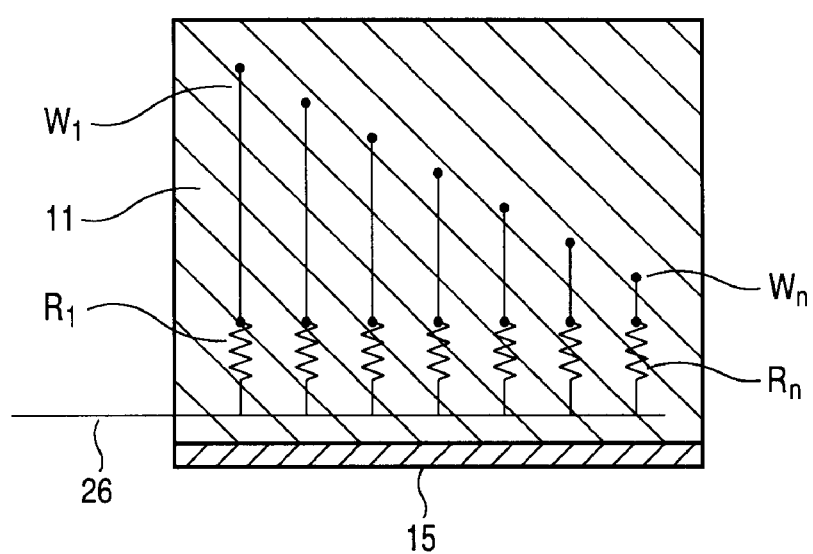
FIG. 4 is a partial cross section view of the brake lining of FIG. 2 according to the preferred embodiment of the present invention.

In an alternate embodiment of the present invention, the conductors $W_{1-n}$ are embedded within the brake lining. Referring to FIG. 4, the conductors are simply embedded within the lining during manufacture thereof. The corresponding resistors may also be embedded within the lining or may be centrally disposed adjacent the lining to reduce the effects of high temperatures during braking. In such instance, a plurality of wires are employed to connect the conductors to the centrally located resistors. Only a single wire harness needs to be employed to in turn connect the resistor array to the ECU. The specific wire connection between the brake lining 11 and ECU is not depicted. Any suitable wire connection readably apparent to one of ordinary skill in the art may so be employed to.

While the foregoing invention has been shown and described with reference to a preferred embodiment, it will be understood by those possessing skill in the art that various changes and modifications may be made without departing from the spirit and scope of the invention. For example, the present invention is not limited to any specific type of resistor or to any specific type of brake assembly.

What is claimed is:

1. A brake lining wear indicator for indicating wear in a brake lining disposed between a brake surface and a brake actuator, said indicator comprising:

a plurality of spaced apart erodable conductors disposed between said brake surface and said actuator, said plurality of erodable elements having progressively decreasing length in a direction between said brake surface and said actuator; and a plurality of resistors at least one each electrically connected and disposed between each of said plurality of conductors and a common ground in a indicator circuit, said indicator circuit electrically connected to said brake surface to complete a circuit extending through and across said brake surface and said common ground, wherein as said brake lining wears said plurality of erodable elements progressively erode to contact said brake surface thereby progressively adding said plurality of resistors in a parallel arrangement across said indicator circuit and progressively reducing an overall resistance between said brake surface and said common ground to indicate progressive brake lining wear.

2. The brake lining wear indicator according to claim 1, wherein said conductors and said resistors comprises at least seven conductors and seven resistors.

3. The brake lining wear indicator according to claim 1, wherein said conductors are made of metal.

4. The brake lining wear indicator according to claim 1, wherein said plurality of resistors have substantially equal resistance and as said conductors progressively contact said brake surface as said brake lining wears said resistance in said indicator circuit decreases.

5. A parallel array of conductors embedded in a brake lining for indicating progressive brake wear in said brake lining, said brake lining and said array of conductors being disposed between a brake surface and a brake actuator, said conductors having progressively increasing lengths in an orthogonal direction extending from said brake surface, each of said conductors having an associated resistor electrically connected thereto an in turn being connected to an indicator circuit for detecting progressive wear of said brake lining, said indicator circuit being electrically connected to said brake surface to complete a circuit across said brake lining, wherein as said brake lining progressively wears an increasing number of said conductors progressively contacts said bake surface thereby progressively adding said resistors to said sensing circuit to progressively change an overall resistance therein to thereby indicate progressive brake lining wear.

6. The device according to claim 1, wherein said array of conductors and associated resistors comprises at least seven conductors and seven resistors.

7. The device according to claim 1, wherein said conductors are made of metal.

8. The device according to claim 5, wherein said plurality of resistors have substantially equal resistance and as said conductors progressively contact said brake surface as said brake lining wears said resistance in said indicator circuit decreases.

9. A brake lining wear sensor circuit assembly for indicating wear in a brake lining disposed between a brake surface and a brake actuator, said assembly comprising:

a parallel array of conductors disposed between said brake surface and said brake lining, said conductors having progressively increasing lengths in a direction extending from said brake actuator to said brake surface;

a plurality of resistors at least one each electrically connected to a corresponding one of said conductors;

an indicator circuit electrically connected to said resistors and to said brake surface completing a circuit extending through and across said brake surface;

wherein as said brake lining wears, said brake surface progressively contacts an increasing number of said conductors thereby progressively adding said parallel arranged resistors to said indicator circuit when contacting said brake surface and thereby progressively changing an overall resistance across said indicator circuit to indicate progressive brake lining wear.

10. The assembly according to claim 9, wherein said parallel array of conductors and corresponding resistors comprises at least seven conductors and associated resistors.

11. The assembly according to claim 9, wherein said conductors are made of metal.

12. The assembly according to claim 9, wherein said plurality of resistors have substantially equal resistance and as said conductors progressively contact said brake surface as said brake lining wears said resistance in said indicator circuit decreases.

* * * * *